United States Patent
Wada et al.

(10) Patent No.: US 9,705,172 B2
(45) Date of Patent: *Jul. 11, 2017

(54) NON-RECIPROCAL CIRCUIT ELEMENT

(71) Applicant: Murata Manufacturing Co., Ltd., Nagaokakyo-shi, Kyoto-fu (JP)

(72) Inventors: Takaya Wada, Nagaokakyo (JP); Reiji Nakajima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,470

(22) Filed: Nov. 25, 2013

(65) Prior Publication Data
US 2014/0080431 A1    Mar. 20, 2014

Related U.S. Application Data

(63) Continuation of application No. PCT/JP2012/061724, filed on May 8, 2012.

(30) Foreign Application Priority Data

Jun. 16, 2011    (JP) .................................. 2011-133756

(51) Int. Cl.
H01P 1/36        (2006.01)
H01P 1/365      (2006.01)
(Continued)

(52) U.S. Cl.
CPC ............... *H01P 1/365* (2013.01); *H01P 1/36* (2013.01); *H01P 1/387* (2013.01); *H04B 1/04* (2013.01)

(58) Field of Classification Search
CPC ............... H01P 1/36; H01P 1/383; H01P 1/38
(Continued)

(56) References Cited

U.S. PATENT DOCUMENTS 5,945,887 A * 8/1999 Makino .................. H01P 1/383
                                                                    333/1.1
6,597,252 B1    7/2003 Okada et al.
(Continued)

FOREIGN PATENT DOCUMENTS

CN        101473490 A     7/2009
JP        2001-053505 A   2/2001
(Continued)

OTHER PUBLICATIONS

Official Communication issued in corresponding Chinese Patent Application No. 201280029230.X, mailed on Aug. 28, 2014.
(Continued)

*Primary Examiner* — Stephen E Jones
(74) *Attorney, Agent, or Firm* — Keating & Bennett, LLP

(57) ABSTRACT

A non-reciprocal circuit element includes a ferrite, a first central electrode and a second central electrode arranged on the ferrite so as to cross each other in an insulated state, and a permanent magnet that applies a DC magnetic field to a portion where the first and second central electrodes cross each other. One end of the first central electrode defines an input port, and the other end thereof defines an output port. One end of the second central electrode defines the input port, and the other end thereof defines a ground port. A resistance element and a capacitance element, which are connected in parallel with each other, are connected in series with and between the input port and the output port. Input impedance is lowered by making inductance of the second central electrode relatively large.

18 Claims, 9 Drawing Sheets

(51) Int. Cl.
*H04B 1/04* (2006.01)
*H01P 1/387* (2006.01)

(58) Field of Classification Search
USPC .................................................. 333/1.1, 24.2
See application file for complete search history.

(56) References Cited

U.S. PATENT DOCUMENTS

| | | | |
|---|---|---|---|
| 7,825,744 B2* | 11/2010 | Kawanami | .................. 333/24.2 |
| 2004/0207479 A1 | 10/2004 | Hasegawa | |
| 2007/0030089 A1* | 2/2007 | Hino | ......................... H01P 1/36 |
| | | | 333/1.1 |
| 2009/0058551 A1 | 3/2009 | Wada et al. | |
| 2009/0237173 A1* | 9/2009 | Ziaei | ......................... H01P 1/38 |
| | | | 333/1.1 |

FOREIGN PATENT DOCUMENTS

| | | |
|---|---|---|
| JP | 2004-088743 A | 3/2004 |
| JP | 2007-208943 A | 8/2007 |
| JP | 2007-300605 A | 11/2007 |
| JP | 4155342 B1 | 9/2008 |
| JP | 2009-049879 A | 3/2009 |

OTHER PUBLICATIONS

Official Communication issued in International Patent Application No. PCT/JP2012/061724, mailed on Jul. 31, 2012.

* cited by examiner

M1: 824.00 MHz
    -0.521 dB

M2: 836.50 MHz
    -0.501 dB

M3: 849.00 MHz
    -0.491 dB

NON-RECIPROCAL CIRCUIT ELEMENT

BACKGROUND OF THE INVENTION

1. Field of the Invention

The present invention relates to non-reciprocal circuit elements and more particularly to a non-reciprocal circuit element, such as an isolator or circulator, preferably for use in microwave bands.

2. Description of the Related Art

Hitherto, non-reciprocal circuit elements, such as isolators and circulators, have characteristics of transmitting signals only in a predetermined specific direction but not in the opposite direction. By making use of these characteristics, for example, isolators are used in transmission circuit sections of mobile communication devices, such as mobile phones.

As a non-reciprocal circuit element of this type, there is known a two-port isolator with low insertion loss as described in Japanese Unexamined Patent Application Publication No. 2007-208943. As illustrated in FIG. 17, in this isolator 100, a first central electrode 135 and a second central electrode 136 (which respectively correspond to inductors L11 and L12) are arranged on the surface of a ferrite 132 so as to cross each other in an insulated state. DC magnetic fields are applied to portions where the first and second central electrodes 135 and 136 cross each other by permanent magnets (not illustrated), so that the first and second central electrodes 135 and 136 are magnetically coupled to each other. One end of the first central electrode 135 serves as an input port P1, whereas the other end thereof serves as an output port P2. One end of the second central electrode 136 serves as the output port P2, whereas the other end thereof serves as a ground port P3. A terminating resistor R11 and a capacitor C11, which are connected in parallel with each other, are connected between the input port P1 and the output port P2. Also, a capacitor C12 is connected in parallel with the second central electrode 136. The first central electrode 135 and the capacitor C11 form a resonant circuit, whereas the second central electrode 136 and the capacitor C12 form a resonant circuit. Further, impedance matching capacitors CS11 and CS12 are respectively connected to the input port P1 and the output port P2. The isolator 100 also includes external connection terminals IN, OUT, and GND.

This isolator 100 is built into a transmission circuit of a mobile phone. Specifically, the input-side external connection terminal IN is connected to a transmission-side power amplifier PA through matching circuits 60 and 70. The output-side external connection terminal OUT is connected to an antenna through a duplexer or the like.

In general, the output impedance of the power amplifier PA is low, e.g., approximately $5\Omega$, whereas the input impedance of the isolator 100 is high, e.g., approximately $50\Omega$. The input impedance of the isolator 100 can be lowered by making an angle at which the first and second central electrodes 135 and 136 cross each other smaller as described in Japanese Unexamined Patent Application Publication No. 2007-208943 and by including the capacitor CS11. However, because of a desire to make the isolator 100 smaller, there is a limit as to how small the crossing angle (the input impedance) is made.

Accordingly, the matching circuit 60 including a capacitor C14 and an inductor L13 and the matching circuit 70 including a capacitor C15 and an inductor L14 are provided between the isolator 100 and the power amplifier PA so that the impedance is gradually increased to match the impedance of the isolator 100. However, providing the matching circuits 60 and 70 leads to an increase in insertion loss and an increase in the number of components or cost of a transmission circuit. As illustrated in FIG. 17, the insertion loss reaches 1.2 dB in total as a result of the insertion loss of the matching circuits 60 and 70, which is 0.7 dB, being added to the insertion loss of the isolator 100, which is 0.5 dB.

SUMMARY OF THE INVENTION

Accordingly, preferred embodiments of the present invention provide a non-reciprocal circuit element that achieves low input impedance and reduces or prevents an increase in the number of components or cost of a transmission circuit as much as possible.

A non-reciprocal circuit element according to a preferred embodiment of the present invention includes a microwave magnetic material; a first central electrode and a second central electrode that are arranged on the microwave magnetic material so as to cross each other in an insulated state; and a permanent magnet arranged to apply a DC magnetic field to a portion where the first and second central electrodes cross each other, wherein one end of the first central electrode defines an input port and the other end of the first central electrode defines an output port, one end of the second central electrode defines the input port and the other end of the second central electrode defines a ground port, and a resistance element and a capacitance element, which are connected in parallel with each other, are connected in series with and between the input port and the output port.

In the non-reciprocal circuit element, inductance of the second central electrode is preferably larger than inductance of the first central electrode. With this configuration, in response to input of a high-frequency signal from the input port, current hardly flows through the second central electrode and a terminating resistor but flows through the first central electrode and is output to the output port. On the other hand, in response to input of a high-frequency signal from the output port, the high-frequency signal does not pass through the first central electrode because of the non-reciprocal property but flows through and is consumed as heat by the resistance element. That is, the current is attenuated (isolated). Relatively large inductance of the second central electrode can lower input impedance to approximately one half of the conventional input impedance. Therefore, matching circuits provided between the non-reciprocal circuit element and a power amplifier can be omitted or the number of matching circuits can be decreased. As a result, insertion loss of a transmission circuit is decreased and the number of components or cost is reduced.

According to various preferred embodiments of the present invention, low input impedance of a non-reciprocal circuit element may be realized and an increase in the number of components constituting a transmission circuit or cost of the transmission circuit are reduced or prevented as much as possible.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
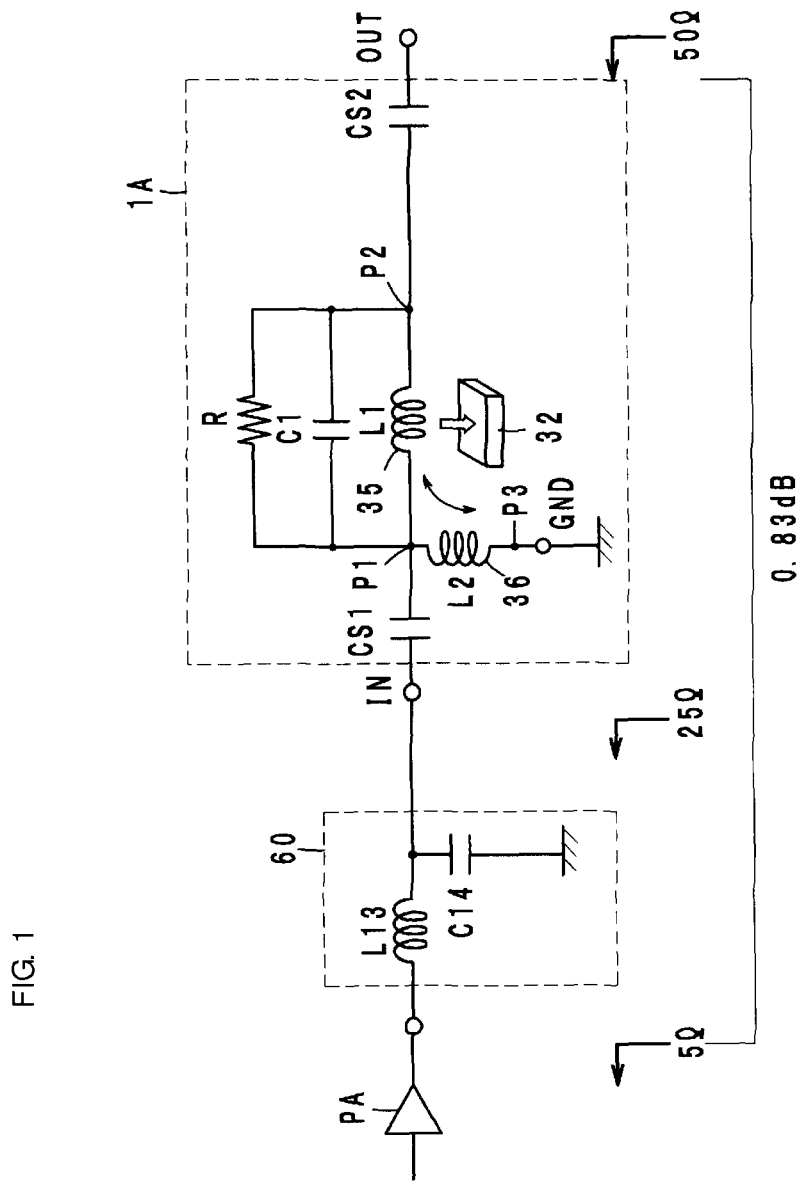
FIG. 1 is an equivalent circuit diagram of a transmission circuit including an isolator according to a first preferred embodiment of the present invention.

Preferred embodiments of a non-reciprocal circuit element according to the present invention will be described below with reference to the accompanying drawings. Note that similar components or portions are denoted by common reference numerals in the drawings and a repeated description will be omitted.

First Preferred Embodiment

As illustrated in an equivalent circuit of FIG. 1, a non-reciprocal circuit element (two-port lumped constant isolator 1A) according to a first preferred embodiment is preferably configured in the following manner. A first central electrode 35 and a second central electrode 36 (which respectively correspond to inductors L1 and L2) are arranged on the surface of a microwave magnetic material (hereinafter, referred to as a ferrite 32) so as to cross each other in an insulated state. DC magnetic fields are applied to portions where the first and second central electrodes 35 and 36 cross each other by permanent magnets 41 (see FIGS. 2 and 3), so that the first and second central electrodes 35 and 36 are magnetically coupled to each other. One end of the first central electrode 35 serves as an input port P1, whereas the other end thereof serves as an output port P2. One end of the second central electrode 36 serves as the input port P1, whereas the other end thereof serves as a ground port P3. A terminating resistor R and a capacitor C1, which are connected in parallel with each other, are connected between the input port P1 and the output port P2. The first central electrode 35 and a capacitor C1 define a resonant circuit. Further, impedance matching capacitors CS1 and CS2 are respectively connected to the input port P1 and the output port P2. The isolator 1A also includes external connection terminals IN, OUT, and GND.

The isolator 1A preferably is built into a transmission circuit of a mobile phone, for example. Specifically, the input-side external connection terminal IN is connected to a transmission-side power amplifier PA through a matching circuit 60. The output-side external connection terminal OUT is connected to an antenna through a duplexer or the like.

Figure 17:
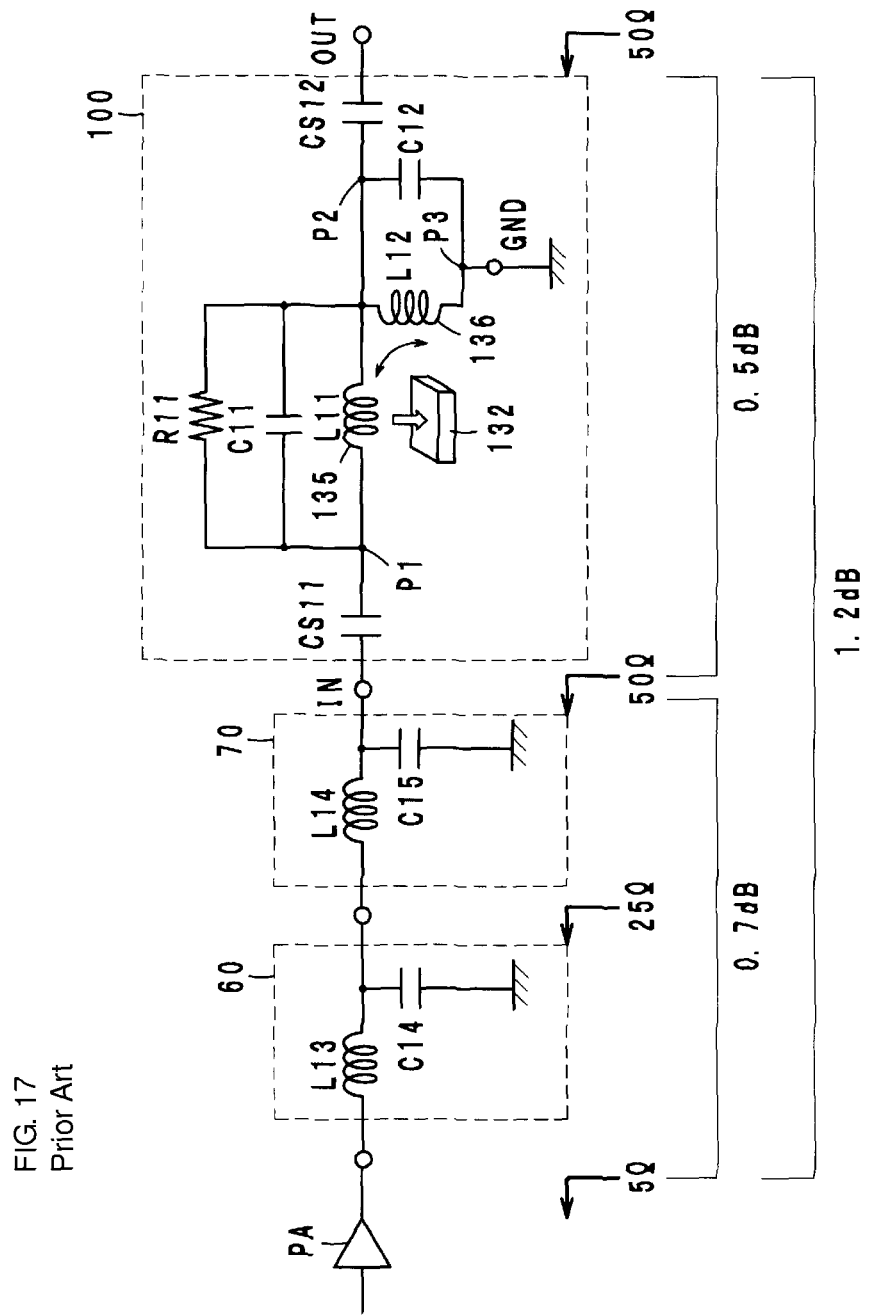
FIG. 17 is an equivalent circuit diagram of a transmission circuit including an isolator according to the related art.

In the isolator 1A, inductance of the second central electrode 36 is preferably set to be larger than inductance of the first central electrode 35. With this configuration, in response to input of a high-frequency signal from the input port P1, current hardly flows through the second central electrode 36 and the terminating resistor R but flows through the first central electrode 35 and is output to the output port P2. On the other hand, in response to input of a high-frequency signal from the output port P2, the high-frequency signal does not pass through the first central electrode 35 because of the non-reciprocal property but flows through and is consumed as heat by the terminating resistor R. That is, the current is attenuated (isolated). Relatively large inductance of the second central electrode 36 can lower input impedance to approximately one half of the conventional input impedance. Therefore, matching circuits provided between the isolator 1A and the power amplifier PA can be omitted or the number of matching circuits can be decreased. Specifically, the matching circuit 70 illustrated in FIG. 17 can be omitted. As a result, insertion loss of the transmission circuit is decreased and the number of components or cost thereof is reduced. Also, an angle at which the first and second central electrodes 35 and 36 cross each other need not be made extremely small in order to lower the input impedance.

Figure 2:
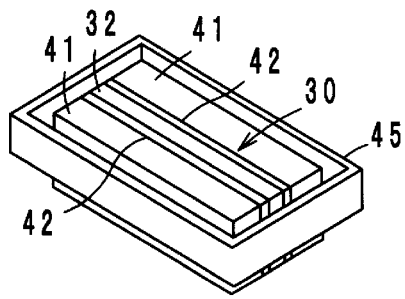
FIG. 2 is an exploded perspective view of the isolator according to the first preferred embodiment of the present invention.
Figure 2:
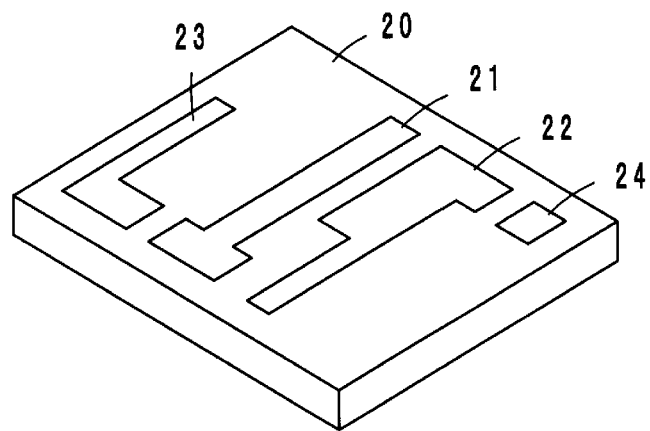
Figure 3:
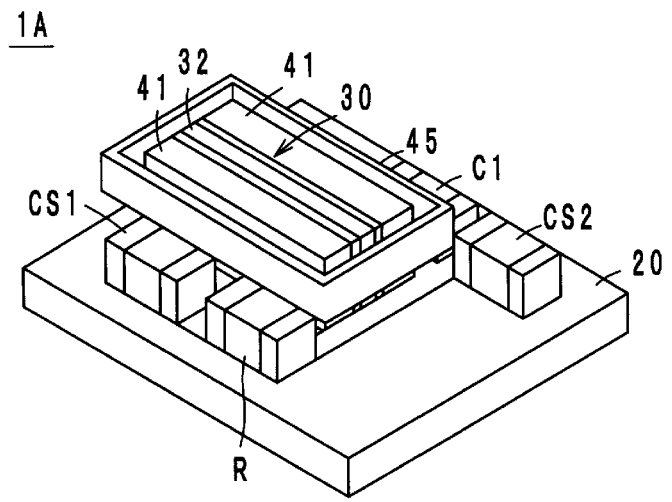
FIG. 3 is a perspective view of the isolator according to the first preferred embodiment of the present invention.
Figure 4:
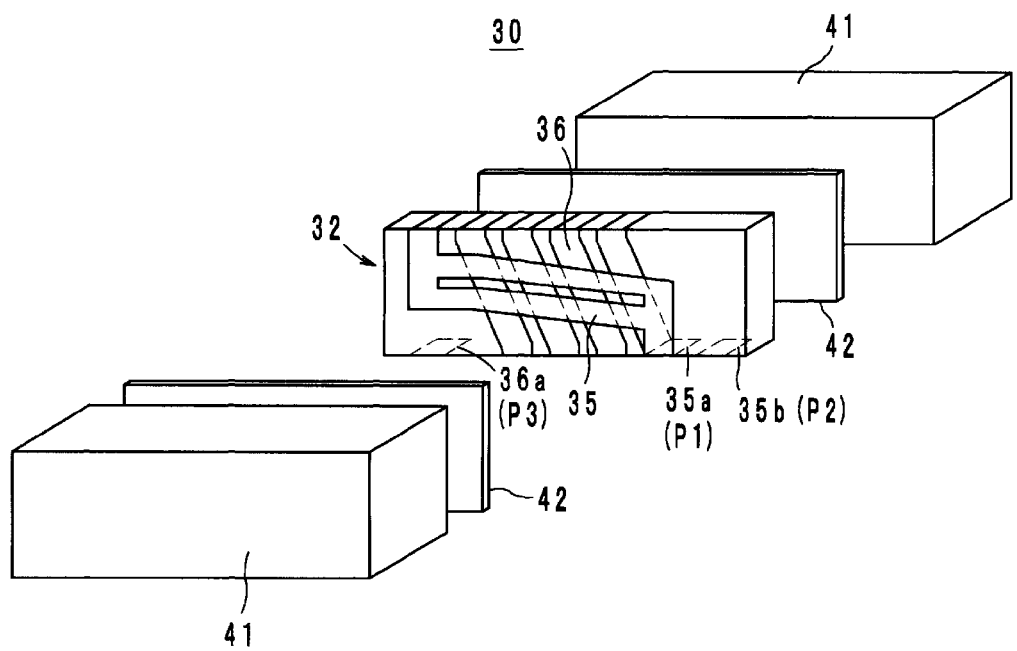
FIG. 4 is an exploded perspective view of a ferrite-magnet element which constitutes the isolator according to the first preferred embodiment of the present invention.

This will be specifically described below. As illustrated in FIGS. 2 to 4, in the isolator 1A, a ferrite-magnet element 30 is mounted on a circuit board 20. In the ferrite-magnet element 30, the ferrite 32 is fixed by the pair of permanent magnets 41 from the right and left sides with an adhesive layer 42 interposed between the ferrite 32 and each of the permanent magnets 41. On the ferrite 32, the first and second central electrodes 35 and 36 (which respectively correspond to the first and second inductors L1 and L2) preferably including conductive films are provided. The ferrite-magnet element 30 is surrounded by a yoke 45. Each of the capacitors C1, CS1, and CS2 and the terminating resistor R which constitute a matching circuit or resonant circuit is configured as a chip and is mounted on the circuit board 20.

As illustrated in FIG. 4, the first central electrode 35 is wound around the ferrite 32 by one turn. An electrode 35a, i.e., one end, serves as the input port P1, whereas an electrode 35b, i.e., the other end, serves as the output port P2. The second central electrode 36 is wound around the ferrite 32 by four turns (note that the number of turns is any given number) so as to cross the first central electrode 35 at a certain angle. The electrode 35a, i.e., one end, (which is shared by the first central electrode 35) serves as the input port P1, whereas an electrode 36a, i.e., the other end, serves as the ground port P3. Note that, in order to avoid complexity, FIG. 4 omits illustration of the electrodes located on the back surface of the ferrite.

The circuit board 20 preferably is a resin board in which a resin substrate and conductor foils are stacked. On the upper surface of the circuit board 20, terminal electrodes 21 to are provided. These terminal electrodes 21 to 24 are connected, through via-hole conductors (not illustrated), to the external connection terminals IN, OUT, and GND (see FIG. 1) formed on the lower surface of the circuit board 20. The electrode 35a (input port P1) located on the ferrite 32 is connected to the terminal electrode 21. The electrode 35b (output port P2) is connected to the terminal electrode 22. The electrode 36a (ground port P3) is connected to the terminal electrode 23. The capacitor C1 is connected between the terminal electrodes 21 and 22. The capacitor CS1 is connected between the terminal electrodes 21 and 23. The capacitor CS2 is connected between the terminal electrodes 22 and 24. Further, the terminating resistor R is connected between the terminal electrodes 21 and 22. In this way, the equivalent circuit illustrated in FIG. 1 is provided.

Figure 5:
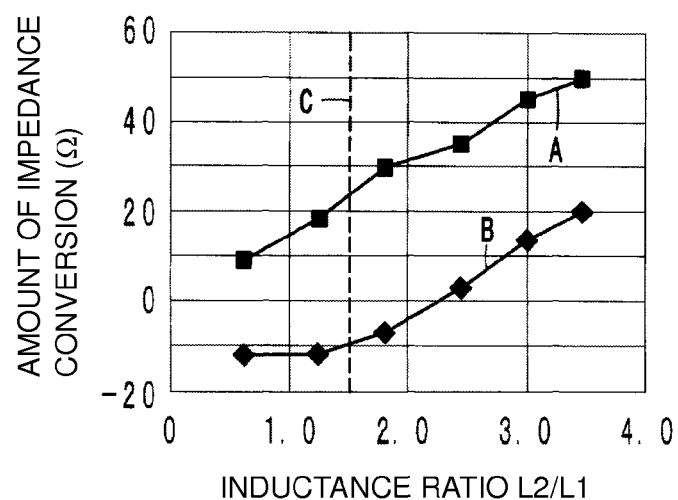
FIG. 5 is a graph illustrating an amount of impedance conversion provided by the isolator according to the first preferred embodiment of the present invention.

Now, an amount of impedance conversion provided between the ports P1 and P2 of the isolator 1A and an inductance ratio L2/L1 between inductances of the first and second central electrodes 35 and 36 are described. Table 1 below and FIG. 5 illustrate a relationship between the inductance ratio L2/L1 and the amount of impedance conversion provided between the ports P1 and P2. The inductance ratio L2/L1 corresponds to a ratio between the numbers of turns of the first and second central electrodes 35 and 36. In FIG. 5, a characteristic curve A denotes the real part of impedance, whereas a characteristic curve B denotes the imaginary part of impedance. A point of intersection of a line C and the characteristic curve A for the real part denotes an amount of impedance conversion for the real part, which is, for example, 25Ω (input 25Ω, output 50Ω.), illustrated in FIG. 1.

TABLE 1

| Ratio between numbers of turns of L2/L1 | Ratio between inductances of L2/L1 | Input impedance (Ω) | | Output Impedance (Ω) | | Amount of impedance conversion (Ω) | |
|---|---|---|---|---|---|---|---|
| | | Real part | Imaginary part | Real part | Imaginary part | Real part | Imaginary part |
| 1 | 0.6 | 1.9 | −9.7 | 11.0 | −22.0 | 9.1 | −12.3 |
| 2 | 1.2 | 9.0 | −23.0 | 27.0 | −35.0 | 18.0 | −12.0 |
| 3 | 1.8 | 20.0 | −38.0 | 50.0 | −45.0 | 30.0 | −7.0 |
| 4 | 2.4 | 35.0 | −48.0 | 70.0 | −45.0 | 35.0 | 3.0 |
| 5 | 3.0 | 50.0 | −58.0 | 95.0 | −45.0 | 45.0 | 13.0 |
| 6 | 3.4 | 70.0 | −65.0 | 120.0 | −45.0 | 50.0 | 20.0 |

Figure 6:
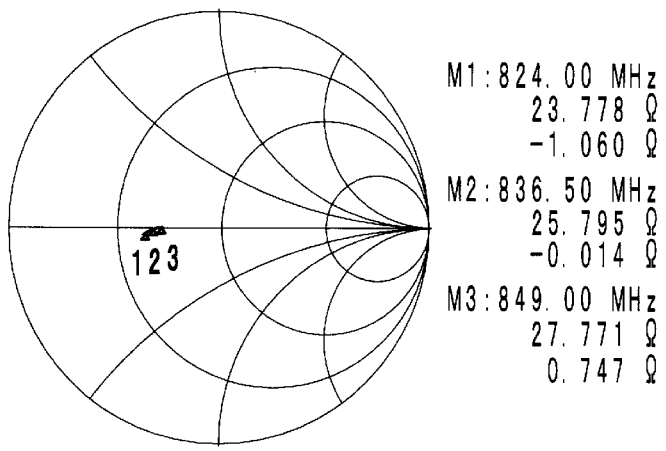
FIG. 6 is a Smith chart illustrating input matching characteristics of the isolator according to the first preferred embodiment of the present invention.
Figure 7:
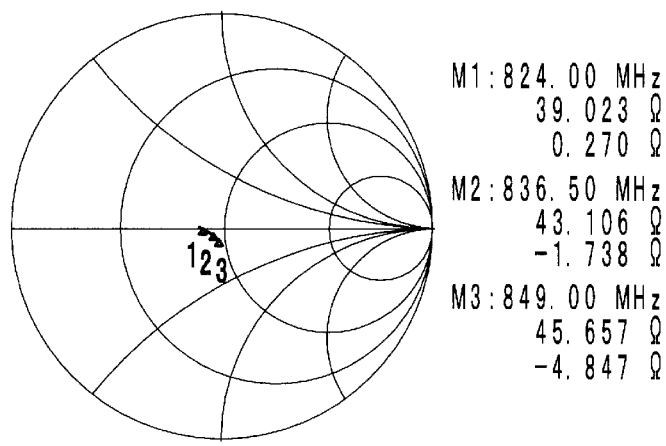
FIG. 7 is a Smith chart illustrating output matching characteristics of the isolator according to the first preferred embodiment of the present invention.
Figure 8:
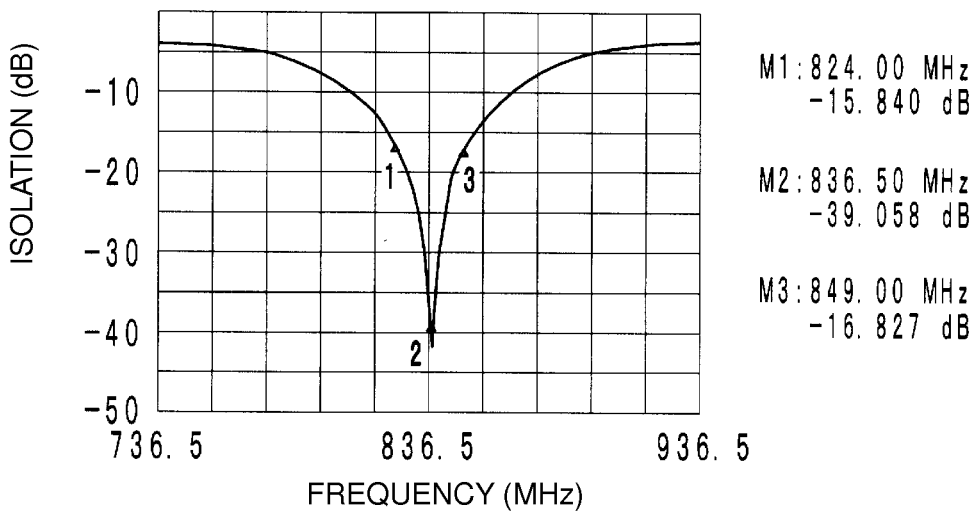
FIG. 8 is a graph illustrating isolation characteristics of the isolator according to the first preferred embodiment of the present invention.
Figure 9:
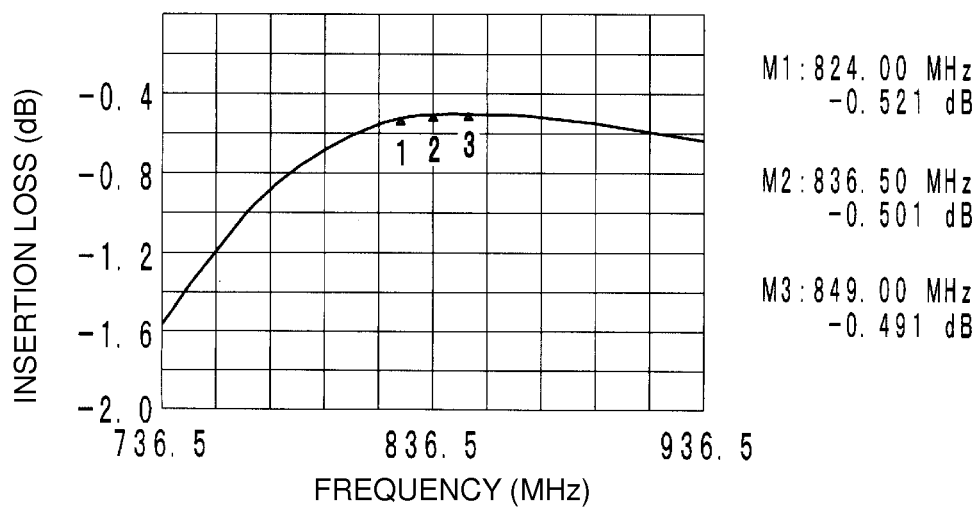
FIG. 9 is a graph illustrating insertion loss of the isolator according to the first preferred embodiment of the present invention.

Specifically, as the inductance ratio L2/L1 increases, the amounts of impedance conversion for the real and imaginary parts increase. By appropriately setting the numbers of turns of the first and second central electrodes 35 and 36, the amount of impedance conversion can be adjusted. Impedance for the imaginary part can be adjusted from a given value to 0Ω by the capacitors CS1 and CS2. Impedance conversion characteristics for 25-50Ω are as illustrated by the Smith chart of FIG. 6. Also, output impedance characteristics are as illustrated by the Smith chart of FIG. 7. FIG. 8 illustrates reverse-direction isolation characteristics. FIG. 9 illustrates forward-direction insertion loss characteristics. These electrical characteristics are for UMTS Band5 for Tx of 824-849 MHz.

As illustrated in FIGS. 6 to 9, the isolator 1A according to the first preferred embodiment has a function of converting the impedance from about 25Ω to about 50Ω and has a significantly low insertion loss of about 0.5 dB, for example. Thus, as illustrated in FIG. 1, only one matching circuit 60 may be provided for the power amplifier PA whose output impedance is 5Ω. In other words, the matching circuit 70 illustrated in FIG. 17 can be omitted. As a result, the total insertion loss is reduced to about 0.83 dB, for example.

Second Preferred Embodiment

Figure 10:
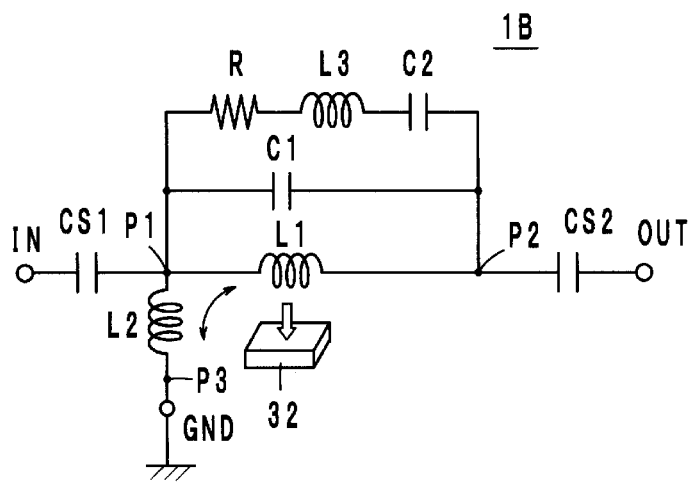
FIG. 10 is an equivalent circuit diagram of an isolator according to a second preferred embodiment of the present invention.

As illustrated in an equivalent circuit of FIG. 10, a non-reciprocal circuit element (two-port lumped constant isolator 1B) according to a second preferred embodiment is configured in the following manner. An inductor L3 and a capacitor C2 are connected in series with the terminating resistor R. The other configuration of the isolator 1B is preferably the same or substantially the same as that of the isolator 1A according to the first preferred embodiment. The isolator 1B is used in the transmission circuit illustrated in FIG. 1 in place of the isolator 1A.

Figure 11:
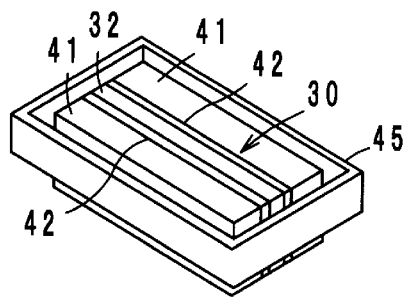
FIG. 11 is an exploded perspective view of the isolator according to the second preferred embodiment of the present invention.
Figure 11:
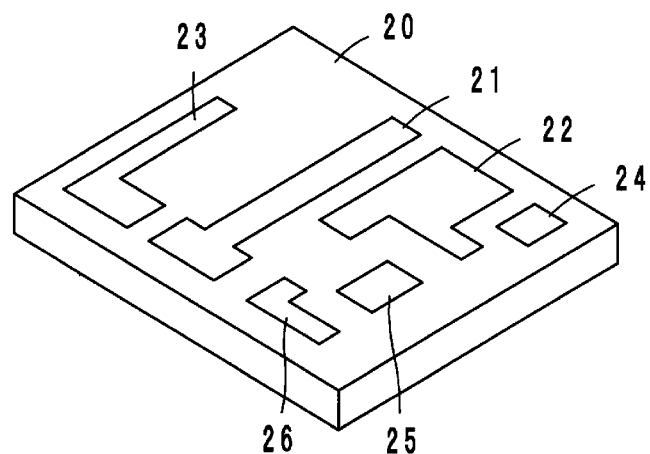
Figure 12:
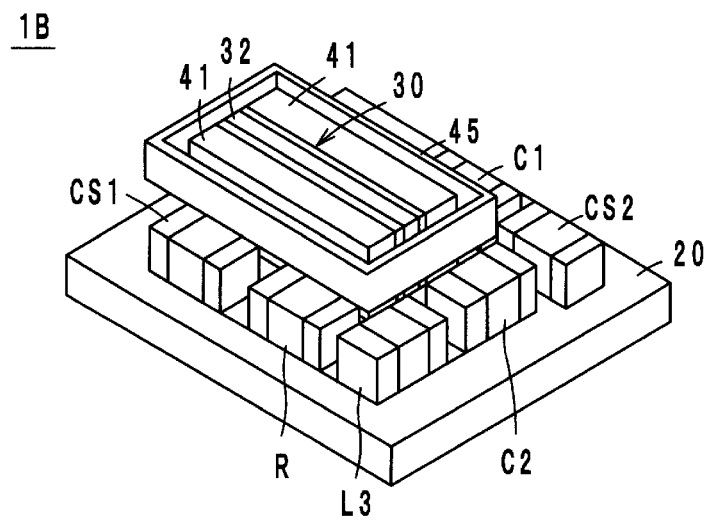
FIG. 12 is a perspective view of the isolator according to the second preferred embodiment of the present invention.

As illustrated in FIGS. 11 and 12, terminal electrodes 21 to 26 are provided on the upper surface of the circuit board 20. These terminal electrodes 21 to 26 are connected, through via-hole conductors (not illustrated), to the external connection terminals IN, OUT, and GND (see FIG. 10) located on the lower surface of the circuit board 20. The electrode 35a (input port P1) located on the ferrite 32 is connected to the terminal electrode 21. The electrode 35b (output port P2) is connected to the terminal electrode 22. An electrode 36a (ground port P3) is connected to the terminal electrode 23. The capacitor C1 is connected between the terminal electrodes 21 and 22. The capacitor CS1 is connected between the terminal electrodes 21 and 23. The capacitor CS2 is connected between the terminal electrodes 22 and 24. The capacitor C2 is connected between the terminal electrodes 22 and 25. Further, the terminating resistor R is connected between the terminal electrodes 21 and 26. The inductor L3 is connected between the terminal electrodes 25 and 26. In this way, the equivalent circuit illustrated in FIG. 10 is provided.

Figure 13:
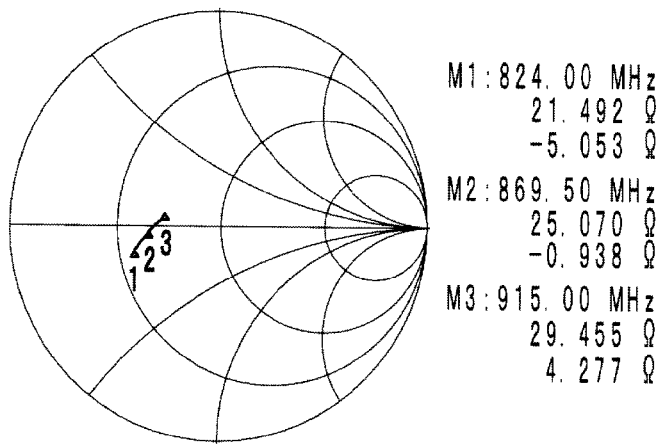
FIG. 13 is a Smith chart illustrating input matching characteristics of the isolator according to the second preferred embodiment of the present invention.
Figure 14:
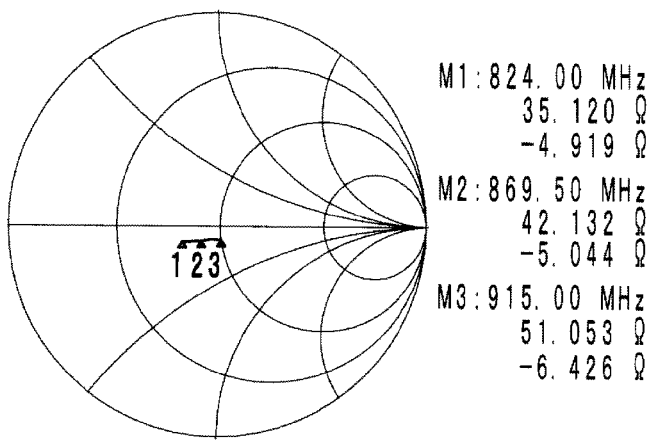
FIG. 14 is a Smith chart illustrating output matching characteristics of the isolator according to the second preferred embodiment of the present invention.
Figure 15:
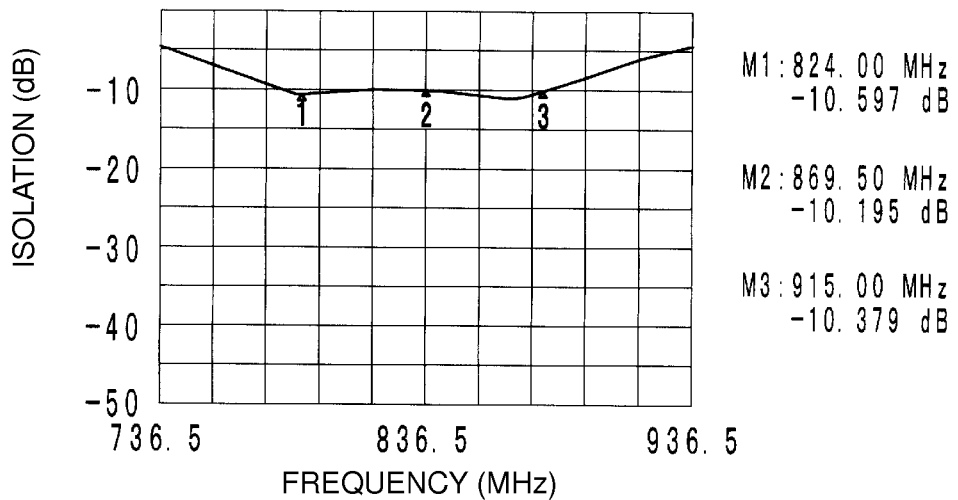
FIG. 15 is a graph illustrating isolation characteristics of the isolator according to the second preferred embodiment of the present invention.
Figure 16:
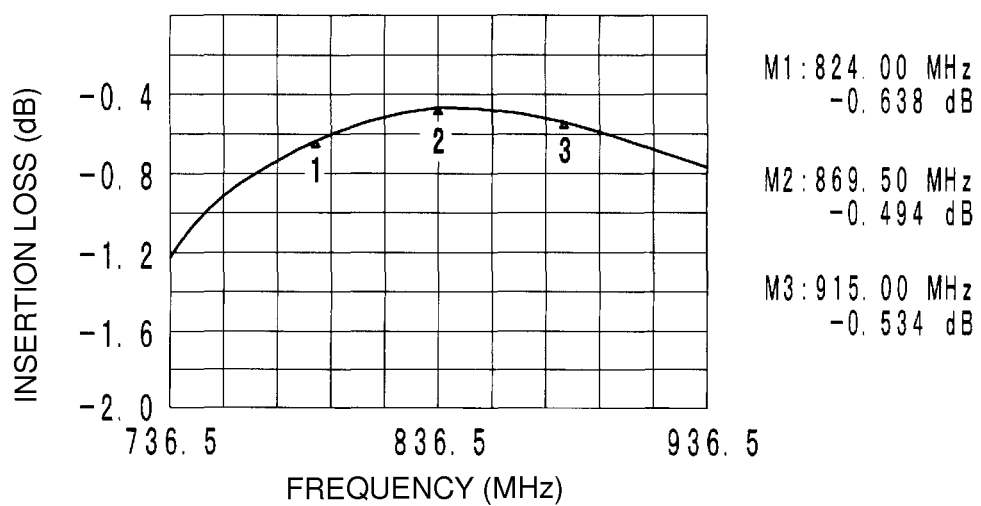
FIG. 16 is a graph illustrating insertion loss of the isolator according to the second preferred embodiment of the present invention.

An amount of impedance conversion provided between the ports P1 and P2 of the isolator 1B and an inductance ratio L2/L1 between inductances of the first and second central electrodes 35 and 36 are as described for the isolator 1A according to the first preferred embodiment. By appropriately setting the numbers of turns of the first and second central electrodes 35 and 36, the amount of impedance conversion can be adjusted. Impedance conversion characteristics for approximately 25-50Ω are as illustrated by the Smith chart of FIG. 13. Also, output impedance characteristics are as illustrated by the Smith chart of FIG. 14. FIG. 15 illustrates reverse-direction isolation characteristics. FIG. 16 illustrates forward-direction insertion loss characteristics. These electrical characteristics are for a dual band of 824-915 MHz obtained by using UMTS Band5 for Tx and Band8 for Tx in combination.

As illustrated in FIGS. 13 to 16, the isolator 1B according to the second preferred embodiment also has a function of converting the impedance from about 25Ω to about 50Ω and has an insertion loss of about 0.64 dB (the worst value within the band), for example. Further, by connecting the inductor L3 and the capacitor C2 in series with the terminating resistor R, a band in which the isolation characteristic of approximately −10 dB is ensured is widened as illustrated in FIG. 15.

Note that the non-reciprocal circuit element according to the present invention is not limited to the above-described preferred embodiments and various alterations can be made within the scope of the gist thereof.

For example, the structure of the ferrite-magnet element 30 and the shapes of the first and second central electrodes 35 and 36 can be variously altered. Further, the capacitance elements and the resistance elements are not necessarily chip components externally mounted on the circuit board but may be built into a multi-layer circuit board.

As described above, preferred embodiments of the present invention are of use in non-reciprocal circuit elements and are particularly excellent in that low input impedance is realized and an increase in the number of components or cost of a transmission circuit is significantly reduced or prevented as much as possible.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A non-reciprocal circuit element comprising:
an input-side external connection terminal;
an output-side external connection terminal;
a microwave magnetic material;
a first central electrode and a second central electrode arranged on the microwave magnetic material so as to cross each other in an insulated state; and
a permanent magnet arranged to apply a DC magnetic field to a portion where the first and second central electrodes cross each other; wherein
one end of the first central electrode defines an input port and the other end of the first central electrode defines an output port;
one end of the second central electrode defines the input port and the other end of the second central electrode defines a ground port;
only the second central electrode is disposed between the input port and the ground port;
a resistance element and a capacitance element are connected in parallel with each other between the input port and the output port; and
an inductance L2 of the second central electrode is larger than an inductance L1 of the first central electrode.

2. The non-reciprocal circuit element according to claim 1, wherein another capacitance element and an inductance element are connected in series with the resistance element.

3. The non-reciprocal circuit element according to claim 1, wherein the non-reciprocal circuit element is a two-port lumped constant isolator.

4. The non-reciprocal circuit element according to claim 1, wherein the first central electrode and the capacitor define a resonant circuit.

5. The non-reciprocal circuit element according to claim 1, further comprising first and second impedance matching capacitors connected to the input port and the output port respectively.

6. The non-reciprocal circuit element according to claim 1, wherein the first and second central electrodes include conductive films.

7. The non-reciprocal circuit element according to claim 1, wherein the first and second central electrodes define first and second inductors.

8. The non-reciprocal circuit element according to claim 1, wherein the non-reciprocal circuit element is configured to have an insertion loss of 0.5 dB.

9. The non-reciprocal circuit element according to claim 1, wherein the non-reciprocal circuit element is configured to have an insertion loss of 0.64 dB.

10. The non-reciprocal circuit element according to claim 1, wherein the resistance element and the capacitance element are connected in series between the input port and the output port.

11. The non-reciprocal circuit element according to claim 1, wherein the input-side external connection terminal is connected to a power amplifier indirectly via the matching circuit;
the matching circuit includes an inductance element and a capacitance element;
the inductance element is connected to both of the power amplifier and the input-side external connection terminal; and
the capacitance element is connected to both of a ground port and a port between the inductance element and the input-side external connection terminal.

12. The non-reciprocal circuit element according to claim 1, wherein an inductance ratio L2/L1 is less than 3.0; and
a real part of an input impedance of the non-reciprocal circuit element is less than 50 Ω.

13. The non-reciprocal circuit element according to claim 12, wherein the inductance ratio L2/L1 is about 1.8 or more.

14. The non-reciprocal circuit element according to claim 12, wherein the inductance ratio L2/L1 is about 0.6 or more.

15. A transmission circuit comprising:
the non-reciprocal circuit element according to claim 1; and
a power amplifier that is connected to the non-reciprocal circuit element.

16. A mobile phone comprising the transmission circuit according to claim 15.

17. The transmission circuit according to claim 15, wherein the non-reciprocal circuit element is a two-port lumped constant isolator.

18. The transmission circuit according to claim 17, wherein the input-side external connection terminal is connected to the power amplifier directly or indirectly via the matching circuit.

* * * * *